United States Patent [19]

Gadreau et al.

[11] Patent Number: 4,937,729

[45] Date of Patent: Jun. 26, 1990

[54] CHOPPER POWER SUPPLY INCLUDING A PRINTED CIRCUIT TRANSFORMER

[75] Inventors: Jean Gadreau, Echirolles; Andre Pascal, St. Joseph de Riviere, both of France

[73] Assignee: Bull S.A., Paris, France

[21] Appl. No.: 353,130

[22] Filed: May 17, 1989

Related U.S. Application Data

[63] Continuation-in-part of Ser. No. 314,065, Jan. 17, 1989.

[51] Int. Cl.[5] .......... H02M 7/538

[52] U.S. Cl. .......... 363/134; 336/183; 363/24

[58] Field of Search .......... 363/24–26, 363/97, 120, 134; 336/183, 200

[56] References Cited

U.S. PATENT DOCUMENTS

| | | | |
|---|---|---|---|
| 3,833,872 | 9/1974 | Marcus et al. | 336/83 |
| 4,311,977 | 1/1982 | Owen | 336/183 |
| 4,518,941 | 5/1985 | Harada | 336/183 |
| 4,622,627 | 11/1986 | Rodriguez et al. | 363/147 |
| 4,730,241 | 3/1988 | Takaya | 363/147 |
| 4,803,609 | 2/1989 | Gillett et al. | 363/17 |

FOREIGN PATENT DOCUMENTS

| | | |
|---|---|---|
| 981390 | 12/1948 | France . |
| 1580316 | 5/1968 | France . |

OTHER PUBLICATIONS

Abstract of Japanese Patent Publication, vol. 10, No. 108, (E-398) (2165), Apr. 23, 1986.

*Primary Examiner*—William H. Beha, Jr.
*Attorney, Agent, or Firm*—Lowe, Price, LeBlanc, Becker & Shur

[57] ABSTRACT

A chopper power supply includes a transformer having first and second primary winding segments as well as first and second secondary winding segments respectively associated with the first and second primary winding segments. First and second switching transistors respond to a control source so that the first transistor connects the first primary winding segment to first and second opposite polarity terminals of a DC power supply at a time mutually exclusive from the time the second primary winding segment is connected to the DC terminals via the second transistor and vice versa. Each of the secondary winding segments includes first and second portions disposed on opposite sides of the primary winding segment associated with the secondary winding segment. The portions of the first secondary winding segment are connected in series with each other and coupled to the first primary winding segment so that voltages induced in the portions of the first secondary winding segment add together. The portions of the second secondary winding segment are connected in series with each other and coupled to the second primary winding segment so that the voltages induced in the portions of the secondary segment add together.

19 Claims, 7 Drawing Sheets

CHOPPER POWER SUPPLY INCLUDING A PRINTED CIRCUIT TRANSFORMER

RELATION TO CO-PENDING APPLICATION

The present application is a Continuation-In-Part of our co-pending commonly assigned application entitled "Printed Circuit Transformer Particularly Adapted For Use With A Chopper Power Supply and A Chopper Power Supply Including Such A Transformer," U.S. patent application Ser. No. 07/314,065, filed Jan. 17, 1989.

TECHNICAL FIELD

The present invention relates generally to chopper power supplies and, more particularly, to a chopper power supply including a transformer with windings arranged so that relatively fixed voltages subsist between turns of a primary winding that are immediately adjacent turns of a split secondary winding and voltages of the secondary winding turns which are most remote from the primary winding undergo maximum variations.

BACKGROUND ART

Some chopper power supplies use printed circuit transformers to minimize the supply size, weight and volume. A printed circuit transformer includes multiple electrically conducting layers forming a primary winding magnetically coupled to a secondary winding, with turns of the primary and secondary windings being formed by stratifying or stacking printed circuit boards on which are formed electrically conducting, i.e., metal, rails that are formed as an almost closed loop.

Chopper power supplies derive currents having extremely rapid variations. The printed circuit transformers of such supplies must have characteristics to preserve the very high frequency components in leading and trailing edges of pulses derived by the supply. It is also desirable for chopper power supplies to use transformers having high degrees of magnetic coupling, to achieve high efficiency. To minimize the volume of the chopper power supply, the transformer is preferably formed as a flat package. It is also desirable for such transformers to have reproducible electrical and mechanical characteristics, to minimize manufacturing controls and waste.

To enable chopper power supplies to achieve efficient operation in a very small volume while maximizing power output, it is necessary to transfer heat from the supply transformer interior to the transformer exterior, i.e., a substantial thermal gradient between the transformer interior and exterior is sought. It is also desirable to minimize parasitic, capacitive coupling between the transformer primary and secondary windings.

It is, accordingly, an object of the present invention to provide a chopper power supply having a new and improved transformer.

Another object of the invention is to provide a chopper power supply having a new and improved printed circuit transformer having high magnetic coupling between primary and secondary windings, to achieve high efficiency operation.

Another object of the invention is to provide a new and improved printed circuit transformer having windings capable of handling currents having extremely rapid variations.

A further object of the invention is to provide a chopper power supply with a new and improved printed circuit transformer having relatively small volume and weight, with optimum thermal characteristics so that heat from the interior of the transformer is easily and readily removed.

Still a further object of the invention is to provide a chopper power supply with a new and improved printed circuit transformer having minimum parasitic capacitive coupling between primary and secondary windings.

Still another object of the invention is to provide a chopper power supply with a new and improved multilayer printed circuit transformer capable of delivering relatively large currents to a load.

DISCLOSURE OF THE INVENTION

In accordance with one aspect of the invention, a chopper power supply includes a transformer having primary and secondary windings connected to each other and a DC voltage source and switching devices of the supply so that (1) terminals of first and second adjacent turns of the primary and secondary windings are at a fixed DC potential of the DC source, and (2) terminals of third and fourth remote turns of the primary and secondary windings have potentials that vary relative to the fixed potential to a greater extent than any other turns of the transformer.

In accordance with another aspect of the invention, a chopper power supply includes a transformer having primary and secondary windings each including plural turns, wherein each individual turn is formed by a printed circuit electrically conducting layer. The turns are (i) magnetically coupled to each other, (ii) stacked in mutually parallel planes, and (iii) connected to each other and a DC voltage source and switching devices of the supply so that (1) terminals of first and second adjacent turns in the stack of the primary and secondary windings are at a fixed DC potential of the voltage source, and (2) terminals of third and fourth conducting layers respectively forming remote turns in the stack of the primary and secondary windings have potentials that vary relative to the fixed potential to a greater extent than any other turns in the stack.

The secondary winding is split into first and second similar parts on opposite sides of the primary winding. First and second turns at opposite ends of the primary winding are configured as electrostatic shields between further turns of the primary winding and the turns of the secondary winding. A first input terminal for the transformer, connected to the fixed DC potential, is common to terminals of the first and second turns. Second terminals of the first and second turns have a common connection. Further turns of the primary winding are connected in series with each other between the common connection of the second terminals and a second transformer input terminal. The transformer second input terminal is connected to a terminal of the switching device which has a relatively large AC variation.

In accordance with a further aspect of the invention, further turns of the primary winding are divided into first and second approximately identical segments on opposite sides of a central plane of the stack. The turns in the first segment are connected to each other via the turns in the second segment; conversely, the turns in the second segment are connected to each other via the turns in the first segment. The first and second turns are respectively in the first and second segments, so that the first turn is connected to a third turn in the second segment via the connection between the third turn and a fourth turn that is located in the first segment.

The turns of the secondary winding are preferably arranged to include aligned terminals in the stack. First, central terminals of all of the secondary winding turns in the stack are aligned. Together, the first and second parts of the split secondary winding include N turns. Each of P turns of the first part includes a second terminal, while each of Q turns of the first part includes a third terminal, where $$(P+Q)=N, \text{ and}$$

$$P=Q+1$$

i.e., P is 1 greater than Q and the sum of P and Q is N. Conversely, each of the Q turns of the second part includes a second terminal, such that each of P turns of the second part includes a third terminal. The aligned second terminals and aligned third terminals are located on opposite sides of the aligned first terminals. The aligned first terminals are connected to each other and a first transformer output terminal. The aligned second terminals are connected to each other and to a second transformer output terminal. One of the P turns in the first part of the stack is farther from the primary winding than any of the other P turns and than any of the Q turns in the first part of the stack; conversely, one of the Q turns in the second part of the stack is closer to the primary winding than any of the other P turns and than any of the Q turns in the second part of the stack. In a similar, but opposite manner, one of the Q turns in the second part of the stack is farther from the primary winding than any of the other Q turns and than any of the P turns in the second part of the stack and one of the Q turns in the first part of the stack is closer to the primary winding than any of the other Q turns and than any of the P turns in the first part of the stack.

Each of the turns includes a pair of closely spaced terminals and an elongated almost closed, circular-like path for conducting electric current between the terminals, such that the terminals of the primary and secondary windings are respectively oppositely disposed relative to each other. The turns are arranged so an opening is in the center of each; the openings of the several turns are aligned in the stack. A magnetic core extending through the aligned openings magnetically couples the windings together.

Each of the first and second turns at opposite ends of the primary winding includes an exterior segment for carrying current between the terminals and an interior portion directly connected to the exterior portion so the interior and exterior portions are at approximately the same potential. The interior portion is arranged so that no direct connection between the terminals of the first or second conducting layers subsists through it. Such a structure provides an electrostatic shield between the primary and secondary windings.

In a first embodiment, particularly adapted for low volume, low power applications, the interior portion includes a finger with an open end. In other embodiments, the interior portion comprises a loop including first and second segments with a gap between them. In such embodiments, the gap is approximately diametrically opposite to the terminals and an electric conductor extends from the first segment to one of the terminals via a path extending past the gap and the second segment in a space between the second segment and the exterior portion of the winding. In one particular configuration of this embodiment, particularly adapted for use in transformers having medium volume and fairly high efficiency, the first and second interior segments are joined so that only one gap subsists between them. In a second arrangement of this embodiment, particularly adapted for high efficiency and high power operation, the first and second interior segments are arranged so that first and second approximately diametrically opposed gaps subsist between them, with the first gap being approximately diametrically opposite to the terminals. A second electric conductor extends between the first and second segments via a path starting at the first segment and extending: past the second gap, past the second segment in a space between the second segment and the exterior portion, through the first gap, past the first segment in a space between the first segment and the core, and past the second gap.

Chopper power supplies using transformers constructed in this manner enable the objects set forth above to be achieved. In particular, the primary and secondary windings are electrostatically shielded from each other, to minimize parasitic capacitive currents in a structure having a very small volume and weight, while achieving high efficiency and excellent thermal characteristics, as well as close magnetic coupling between the primary and secondary windings.

The above and still further objects, features and advantages of the present invention will become apparent upon consideration of the following detailed description of a specific embodiment thereof, especially when taken in conjunction with the accompanying drawings.

BEST MODE FOR CARRYING OUT THE INVENTION

Figure 1:
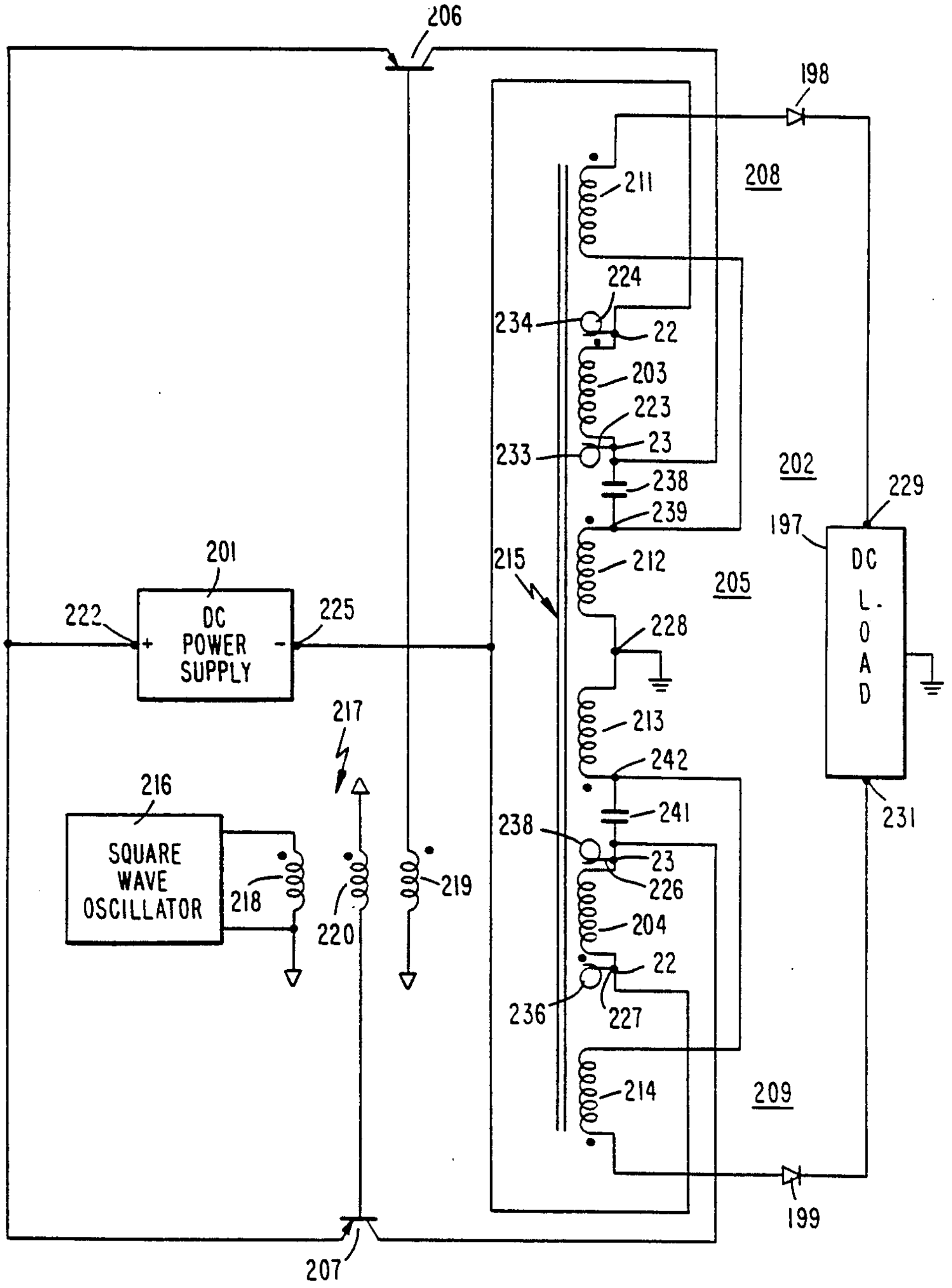
FIG. 1 is a circuit diagram of a chopper power supply according to a preferred embodiment of the invention.

Reference is now made to FIG. 1 of the drawing, a circuit diagram of a chopper power supply of the invention, wherein the DC voltage of DC power supply 201 is converted into high frequency, for example, 200 kiloHertz, square wave pulses that are supplied to load 202, typically an AC to DC converter including rectifiers 198 and 199 that drive DC capacitive computer load 197. Supply 201 is connected to split, identical primary windings 203 and 204 of transformer 205 via switching transistors 206 and 207, preferably either power bipolar or field effect devices. Primary windings 203 and 204 are frequently referred to herein as half-windings, since each forms one-half of the entire primary winding of transformer 205. Transformer 205 includes two half secondary windings 208 and 209, each of which is split into two segments including an equal number of turns. Winding 208 includes segments 211 and 212 on opposite sides of half primary winding 203, while winding 209 includes segments 213 and 214 on opposite sides of half primary winding 204. All of half-windings 203, 204, 208, and 209, including segments 211–214, are magnetically coupled together by magnetic core 15.

Windings 203 and 204 are connected at mutually exclusive times to be responsive to current from supply 201 via switching transistors 206 and 207, driven into conducting states by square wave oscillator 216 and pulse transformer 217. Transistors 206 and 207 are responsive to pulses from transformer 217 so that transistor 206 conducts while transistor 207 is cut off and vice versa. Oscillator 216, typically having a frequency of about 200 kiloHertz, drives primary winding 218 of transformer 217 with square wave pulses that are coupled with opposite polarity to the bases of transistors 206 and 207 by secondary windings 219 and 220 of the transformer. Transistor 206 includes an emitter collector path in series between positive terminal 222 of supply 201 and terminal 223 of half-winding 203. Opposite terminal 224 of half-winding 203 is connected to negative terminal 225 of supply 201. Similar connections are established between terminals 226 and 227 of half-winding 224 to terminals 222 and 225 via transistor 207.

Secondary winding segments 211 and 212 are connected in series with each other and magnetically coupled to half-winding 203 so that the AC voltage is induced in the winding segments. Winding segments 211 and 212 are connected between ground terminal 228 and load terminal 229. Because load 202 includes a grounded terminal, current flows from the series combination of secondary windings 211 and 212 through terminal 229 to ground in load 202 while transistor 206 is forward biased into a conducting state to deliver positive current through half primary winding 203 in the direction from terminal 223 to terminal 224. Similarly, during the time while transistor 207 is in a forward biased, conducting state, positive current flows from the series combination of windings 213 and 214 into terminal 231 of load 202 to ground. From the foregoing, transformer 205 is basically operated in a push-pull manner.

Terminals 223 and 227, being directly connected to negative terminal 225 of DC power supply 201, are at all times maintained at the same voltage level. In contrast, terminals 224 and 226, connected to the collectors of switching transistors 206 and 207, respectively, undergo very wide voltage variations. For example, when transistor 206 is cut off and all energy stored in coil 203 has been dissipated, terminals 223 and 224 are at substantially the same voltage. However, immediately after a change in state of transistor 206, as a result of the transistor being switched from a cutoff to a conducting state or vice versa, the voltage at terminal 224 undergoes substantial changes. The same is true, but at opposite times, for the voltage at terminal 226.

As described infra in greater detail, each of primary half-windings 203 and 204 includes a pair of shield turns, for electrostatically decoupling the remaining, active turns of each primary half-winding from the secondary winding segments associated therewith. Half primary winding 203 includes shield turns 233 and 234, each having a terminal connected to terminals 223 and 224, respectively. Each of shield turns 233 and 234 includes a second, open circuited terminal. Similarly, one end of each of shield turns 235 and 236 is connected to terminals 226 and 227 of half primary winding 204, while the other ends of these shield turns are open circuited. Shield turns 233 and 234, being at the same DC potentials as terminals 223 and 224, provide electrostatic shielding for parasitic currents that otherwise have a tendency to flow between half winding 203 and winding segment 211 and between half-winding 203 and winding segment 212.

Capacitor 238, connected between terminal 223 of half primary winding 203 and adjacent terminal 239 of secondary winding segment 212, decouples the half-winding from secondary winding segment 212, for DC currents, but has a value such that AC currents are easily coupled between these two terminals. Capacitor 238 thus has a tendency to reduce further parasitic, capacitive currents that flow between half-winding 203 and winding segment 212. Capacitor 241 is connected between terminal 226 and adjacent terminal 242 of secondary winding segment 213 for the same reason. Capacitors 238 and 241 have the same nominal value such that they have very low impedance to the frequency of square wave oscillator 216.

In the preferred embodiment the individual turns of transformer 205 are formed as printed circuit conductors on stacked dielectric printed circuit boards. The windings on the stack of boards are magnetically coupled together by core 215.

Figure 2:
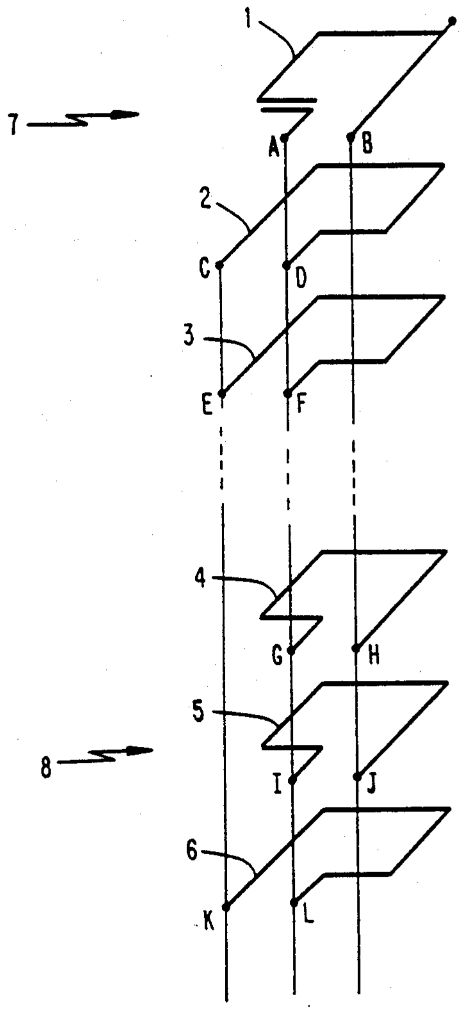
FIG. 2 is a diagram of turns of a secondary winding in accordance with the invention and includes an indication of the manner in which the turns of the secondary winding are connected with each other.
Figure 3:
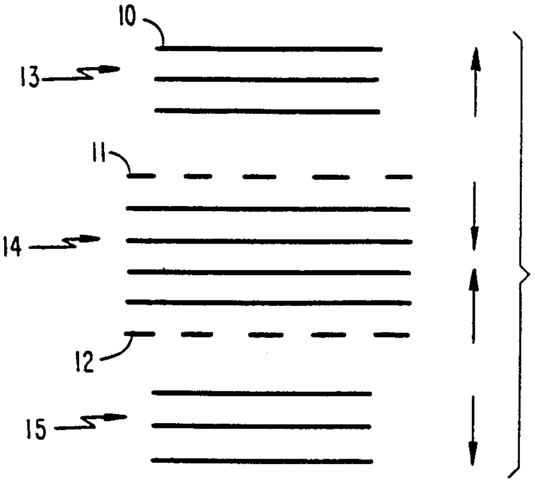
FIG. 3 is a diagram indicating how the turns of a transformer in accordance with the invention are stacked or stratified.
Figure 4:
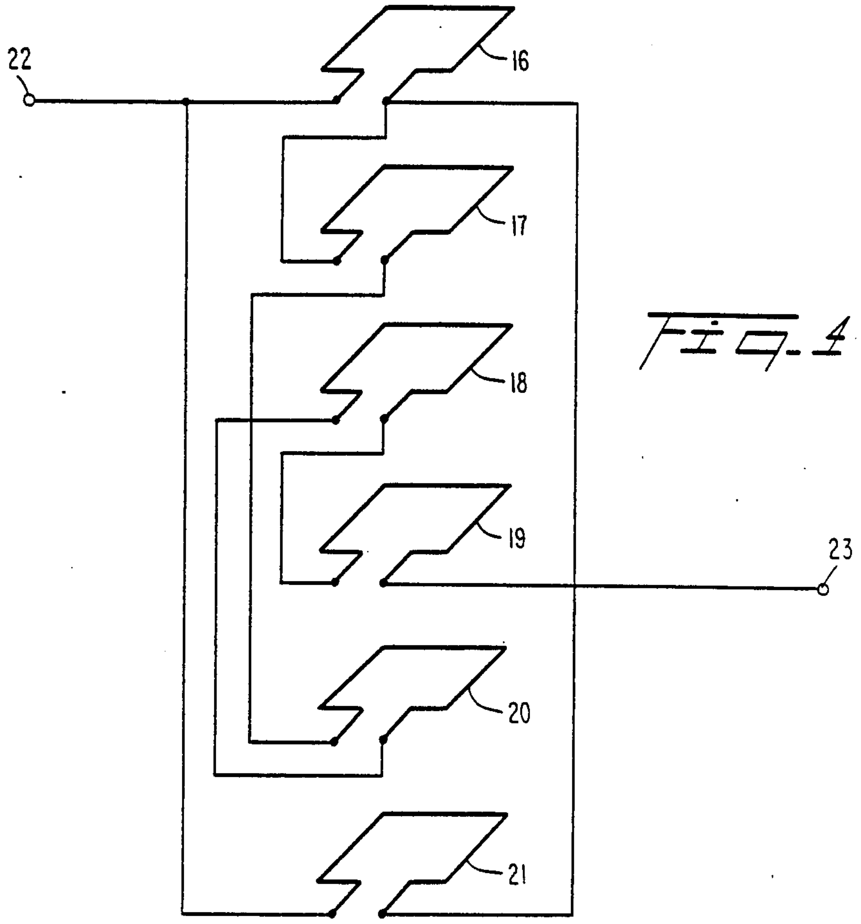
FIG. 4 is a diagram of the turns of a primary winding of a transformer in accordance with the invention, and; an indication of how these turns are connected.

Consideration is now given to details of the half-secondary and half-primary windings, by referring to FIGS. 2–4. FIG. 2 is a schematic diagram of one of the half-secondary windings, such as half-winding 208. The half-secondary winding illustrated in FIG. 2 includes six turns 1–6, arranged so that turns 1–3 form one segment of the half-secondary winding, while turns 4–6 form a second segment of the half secondary winding.

Windings 1–6 have terminals A–L, such that windings 1, 2 and 3 respectively include terminals A and B, terminals C and D, and terminals E and F, while turns 4, 5 and 6 respectively include terminals G and H, terminals I and J, and terminals K and L. Terminals A–L are arranged in three aligned columns, such that: the center column (as illustrated in FIG. 2) includes one terminal of each turn, the left column (as illustrated in FIG. 2) includes terminals C, E and K of turns 2, 3 and 6, respectively, and the right column includes terminals B, H and J of turns 1, 4 and 5 respectively.

Terminals A–L are interconnected so that all terminals in the center column are connected with each other, all terminals in the left column are connected with each other and all terminals in the right column are connected with each other. Terminals A–L are thus interconnected such that turn 1 corresponds to turns 4 and 5, while turns 2 and 3 correspond to turn 6. The particular configuration assists in reducing leakage caused by separating segments 7 and 8 of the half-secondary winding, to assist in minimizing parasitic currents having a tendency to flow between the segments.

In an actual transformer, where the half-secondary winding contains a greater number of turns than illustrated in FIG. 2, the illustrated arrangement is repeated as many times as is necessary to achieve the desired output current.

FIG. 4 is an illustration of half- primary winding 203 which is disposed between split segments 7 and 8 of half-secondary winding 208, FIG. 1. The illustrated half-primary winding 203 includes six stacked or stratified turns 16–21, connected between terminals 22 and 23, which correspond respectively with terminals 223 and 224, FIG. 1. In the chopper power supply of FIG. 1, terminal 22 is connected to terminal 225 of DC supply source 201, while terminal 23 is connected to switching transistor 206. Turns 16 and 21, respectively at the top and bottom of the stack, and in closest proximity to turns 3 and 4 of the secondary winding are formed as shields to prevent parasitic currents from flowing between the half-primary and secondary windings, particularly currents that flow as a result of electrostatic coupling between the half-primary and secondary windings.

Opposite terminals of turns 16 and 21 are connected to each other, with the terminals illustrated as being on the left side of turns 16 and 21 having a common connection to terminal 22, and the terminals on the right side of turns 16 and 21 having a common connection to the left terminal of turn 17. Turns 17–20 are arranged so that current flowing into the left terminal of turn 17 flows, in order, through turns 17, 20, 18 and 19, thence to terminal 23, which constitutes a terminal of the primary winding arrangement illustrated in FIG. 4. Terminals 22 and 23 of the winding corresponding to winding 203 are respectively connected to terminal 225 of chopper power supply 201 and to the collector of transistor 206. Terminals 17–20 are considered to be active terminals of the primary winding arrangement illustrated in FIG. 4, while turns 16 and 20 function as electrostatic shields, driven in parallel by the current flowing into terminal 22. Turns 16 and 21 include active segments for the current flowing between terminals 22 and 23, as well as passive shield portions. Turns 16–21 are connected to each other and the DC source and switching transistors of the chopper supply so that the voltages in proximity to the external portions of the stacked winding arrangement, i.e., the voltages of turns 16 and 21, are relatively constant, while the voltages in the interior of the winding arrangement, in particular, between windings 18 and 19, undergo maximum variation relative to the fixed voltages.

The half-primary winding arrangement of FIG. 4 and the half-secondary winding arrangement of FIG. 2 are mounted together so that the half-primary winding is between the two segments of the half-secondary winding, as illustrated in FIG. 3; the winding arrangement of FIG. 3 is represented by half-primary winding 14, while the winding arrangement of FIG. 2 is represented by half-primary winding segments 13 and 15. Turns 16 and 21 of FIG. 4 are respectively represented in FIG. 3 by turns 11 and 12, with turn 11 being disposed between the lowest turn of half-secondary winding segment 13 and the highest active turn of half-primary winding 14. Turn 12 is disposed in the stack between the lowest active winding in half-primary winding 14 and the highest turn of half-secondary winding segment 15. All of the turns in the transformer arrangement illustrated in FIG. 3 are in mutually parallel planes and are in a stacked relationship.

The potential variations between the turns inside of the half-primary winding 14 and segments 13 and 15 of the half-secondary winding are represented in FIG. 3 by the arrows on the right side of the Figure, assuming that terminal 22 is connected to a fixed DC potential terminal 225 of chopper power supply 201 and terminal 23 is connected to the collector of switching transistor 206. The arrows have arrowheads representing the polarity of the voltage of the half-transformer illustrated in FIG. 3 at a particular time instant. The arrows are arranged so that the arrowheads represent maximum variations of the AC potential in the transformer, while the ends of the arrows opposite from the arrowheads represent relatively fixed potentials in the transformer. Therefore, from FIG. 3, relatively fixed potentials subsist at shield turns 11 and 12, while maximum potential variations occur in a median plane of stacked primary winding 14 and at the extremities of winding segments 13 and 15 remote from primary semi-winding 14. It follows that there are minimum potential variations in the turns of winding segments 13 and 15 in closest proximity to screen turns 11 and 12.

Consideration is now made to the general case of a primary winding having 2P stacked turns. The turns in the stack are numbered consecutively from 1 to 2P. Since only active turns, i.e., turns which conduct current between terminals 22 and 23, are considered, the two turns which function as electrostatic shields are not now considered.

The 2P turns are connected in series with each other so that turns on opposite sides of the median plane of the stack are directly connected to each other. The connections are such that first and second turns equally displaced on opposite sides of the median plane are arranged so that a first terminal of the first turn is connected to a second terminal of the second turn. The connections to the second turn and a third turn, immediately adjacent the first turn are such that a first terminal of the second turn is connected to the second terminal of the third turn. Hence, connections are established between a series of pairs of series connected turns. The last such pair of series connected turns, i.e., the two turns which are closest to and on opposite sides of the median plane, are referred to as turns P and P+1. The two turns most remote from the median plane of the stack are denominated as 1 and 2P, which are series connected with each other. Consider turn K in the stack; turn K is series connected with turn 2P−K+1 such that turns K and 2P−K+1 are equally displaced on opposite sides of the median plane of the stack. Thus, for the generalized situation, the electrical connection of two turns is noted as (K, 2P−K+1). In the exemplary situation of FIG. 4, 2P=4; for K=1, the turn pair consists of turns 17 and 20; for K=2, the turn pair consists of turns 18 and 19.

The formula for implementing P series connected turn pairs is:

$$\sum_{K=1}^{K=P} (K, 2 - K + 1)$$

Thus, each pair of turns can be considered as having an input terminal on turn K and an output terminal on turn 2P−K+1. (The terms input and output terminals in the previous sentence refer to the direction of the current flow at a particular instant of time under consideration.) In FIG. 4, implementation of the output terminal of turn K is connected to the input terminal of turn K+1.

By causing the potentials or voltages of the transformer to be as illustrated in FIG. 4, capacitor leakage currents produced by the voltages between adjacent turns of the primary and secondary windings are minimized.

Figure 5A:
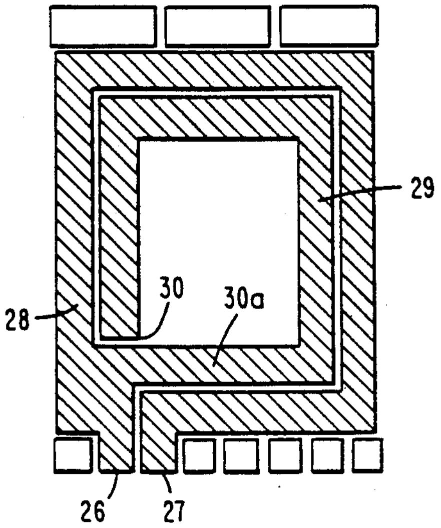
FIGS. 5A-5C are top views of three different embodiments of primary winding turns that electrostatically shield remaining turns of the primary winding from turns of the secondary winding.
Figure 5B:
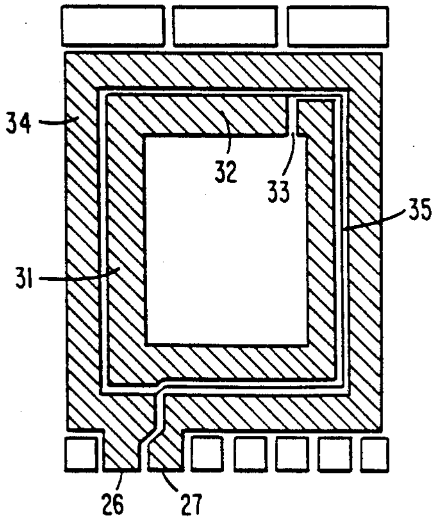
Figure 5C:
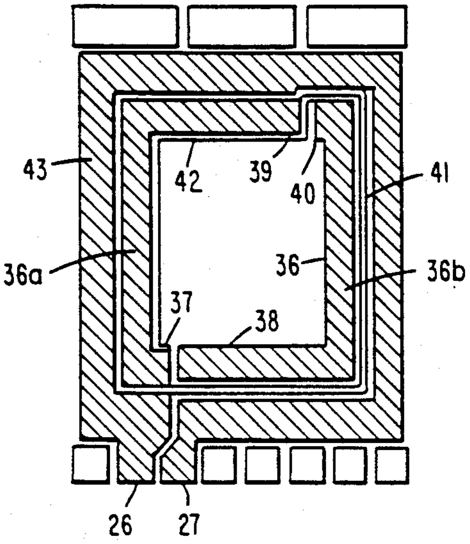

FIGS. 5A, 5B and 5C are diagrams of three different embodiments of the exterior turns of the primary winding of FIGS. 3 and 4. Each of the turns illustrated in FIGS. 5A–5C includes an active portion and an electrostatic shield portion. The turns illustrated in FIGS. 5A–5D are metal layers deposited on dielectric substrates, not shown. The turns illustrated in FIGS. 5A, 5B and 5C are represented in FIG. 4 by turns 16 and 21, and in FIG. 3 by turns 11 and 12. The shield segments of the turns illustrated in FIGS. 5A, 5B and 5C are particularly adapted to minimize parasitic currents having a tendency to flow between the primary and secondary windings. The turns of FIGS. 5A, 5B and 5C include closely spaced terminals 26 and 27 proximate one corner of the turn. Terminals 26 and 27 are diametrically opposed to terminals 24 and 25 (FIG. 5D) of the secondary winding turn immediately adjacent the shield turn.

Figure 5D:
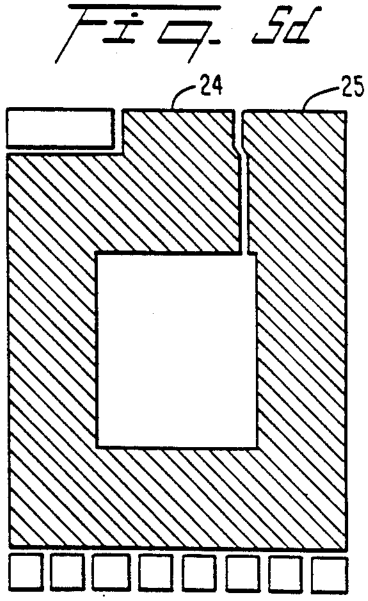
FIG. 5D is a top view of a turn in the secondary winding in accordance with the invention.

The active secondary turn illustrated in FIG. 5D, which is disposed immediately adjacent the screen turn, corresponds to either turn 3 or turn 4, FIG. 2. The turn illustrated in FIG. 5D includes a partially closed metal rail or track having a hollow central portion, defining a window. The window allows the turns of the printed circuit transformer to be stacked to form a column for receiving a magnetic core. The turn illustrated in FIG. 5D includes a substantially longitudinal cut between terminal portions 24 and 25 so that these terminal portions are spaced from each other, and insulated from each other for DC currents. The slot extends between terminal portions 24 and 25 and the central window and includes two elongated, slightly misaligned portions that are connected together by a short diagonal segment. Thereby, the electrical resistance in the radial direction between the central window and terminals 24 and 25 is increased.

Terminal regions 26 of the shield turns illustrated in FIGS. 5A, 5B and 5C and terminal 24 of the adjacent secondary winding turn are at the same fixed potential, but are decoupled from each other by capacitor 238 (FIG. 1) having a very small impedance for the frequency of oscillator 216.

The shield turn illustrated in the embodiment of FIG. 5A, which is particularly adapted for small transformers having average efficiency, includes oppositely directed interior and exterior segments 28 and 29, respectively forming the active and shield portions of the turn. Terminal 26, which corresponds with the left terminals of turns 16 and 21, FIG. 4, is directly connected to one end of exterior segment 28, while terminal 27, which corresponds with the right terminals of turns 16 and 21, is connected directly to the opposite end of exterior segment 28. Terminal 26 is also connected to one end of interior segment 29. Terminal 26, being connected to terminal 22, FIG. 4, is at the fixed potential of terminal 225; the adjacent secondary turn is at a potential that varies only slightly relative to terminal 26.

Interior and exterior segments 28 and 29 are in very close proximity to each other, being separated only by a very narrow slot that extends to terminal regions 26 and 27. Segment 28 is formed as an almost closed turn, having a rectangular form. Segment 29 has an exterior edge that extends in very close proximity to an interior edge of segment 28, with the two edges being spaced from each other only by a slot. Segment 29, extending around the four sides of segment 28, includes edge 30 that is generally aligned with terminal segment 26 in closely spaced relationship to the beginning of segment 29. Since only one end of segment 29 is connected to a terminal, with the other end 30 of the segment being spaced from all other parts of the turn, segment 29 does not conduct current fed by supply 201 to terminal 22, but is at the same DC potential as terminal 22. Segment 29 thus functions as a shield Interior segment 29 includes an interior edge in very close proximity to a center leg of a magnetic core which extends through the central window of the turn.

The turn illustrated in FIG. 5B, particularly adapted for transformers employed in chopper power supplies having average power and superior efficiency, includes interior segment 31 and exterior segment 34, having opposite ends connected to terminals 26 and 27. Segment 34 is formed very similarly to exterior segment 28 of FIG. 4A, except that the slot separating terminals 26 and 27 includes two slightly displaced longitudinal segments connected to each other by a diagonal segment.

Interior segment 31 differs considerably from the interior segment in the embodiment of FIG. 5A, being formed as an almost closed loop having a gap defined by a region between parallel edges 32 and 33 which are diametrically opposed to terminal segments 26 and 27. The gap extends in the same general direction as the slot between terminal segments 26 and 27. Interior segment 31 is shaped virtually the same as exterior segment 34. Parallel edges of interior and exterior segments 31 and 34 are in very close proximity to each other, being separated by a substantially rectangular, elongated slot.

Segment 31 is connected to segment 34 by a very narrow metal lead line 35 extending in the slot between the interior and exterior segments Line 35 begins at a corner of segment 31 intersecting edge 32 and extends past a slot defined by edges 32 and 33 of segment 31, thence in the slot separating segments 31 and 34, and past the slot separating terminals 26 and 27 into engagement with segment 34 at a point on the interior edge of segment 34 in proximity to terminal 26. Exterior segment 34 is an active primary winding turn, while interior segment 31 functions as an electrostatic shield. The interior edges of segment 31 are in very close proximity to the magnetic core which passes through a rectangular window or opening bounded by the interior edges of interior segment 31. Interior segment 31 is at approximately the same potential as terminal segment 26, by virtue of the connection of line 35 to the portion of exterior segment 34 in proximity to terminal portion 26. However, there is no DC current path in interior segment 31 because of the gap between edges 32 and 33. Interior segment 31 is an electrostatic shield to minimize capacitive currents from the primary to the secondary winding.

The primary winding turn illustrated in FIG. 5C, particularly suited for high power transformers having very high efficiencies, includes exterior winding segment 43 which is basically similar to winding segment 28. The embodiment of FIG. 5C includes interior winding segment 36, shaped somewhat similar to winding segment 43. Segment 36 has exterior edges in very close proximity to, but slightly spaced from, the interior edges of winding edges 43. Segment 36 includes a central window through which the magnetic core extends, so that the magnetic core is in very close proximity to the interior edge of segment 36.

Segment 36 is divided into first and second parts 36*a* and 36*b*, separated from each other by first and second diametrically opposed slots. The first slot, defined by parallel edges 37 and 38, aligned with edges of the slot between terminals 26 and 27, is in close proximity to the slot between terminal regions 26 and 27. The second slot, defined by parallel edges 39 and 40 which extend parallel to each other and to edges 37 and 38, are in proximity to a corner of winding segment 36 that is diametrically opposed to the slot separating terminal segments 26 and 27. Segments 26 and 27 are connected to each other by metal lead lines 41 and 42. A point on edge 39 in the slot separating the exterior edge of interior winding segment 36 from an interior edge of exterior winding segment 43 is connected to a point on exterior winding segment 43 in proximity to terminal 26 by metal lead line 41. Metal lead line 41 extends from a point on edge 39 of segment part 36*a* in proximity to segment 43 past the gap in interior segment 36 defined by edges 39 and 40, thence through the space between the interior and exterior edges of segments 36 and 43, past the gap separating terminals 26 and 27 to the point on exterior segment 43 proximate terminal 26.

Lead line 42 is connected to a point on edge 37 on segment part 36*a* proximate terminals 26 and 27, in the space between the interior and exterior edges of segments 36, i.e., the point on segment 36 defined by the intersection of edge 38 and the interior edge of segment part 36*a*. Lead line 42 begins at the stated point on edge 37 and extends past the gap between edges 37 and 38 in the space between the exterior and interior edges of segments 36 and 43 until the lead line encounters the gap between edges 39 and 40 which it traverses. After lead line 43 has traversed the gap between edges 39 and 40, it extends around the interior edge of segment part 36*b* in close proximity to these edges; lead line 42 crosses the gap between edges 37 and 38 and is connected to a point on segment part 36*b*.

From the foregoing, no closed DC current path subsists in parts 36*a* and 36*b* of interior winding segment 36. However, both winding segments 36*a* and 36*b* are at approximately the same potential as terminal portion 26, by virtue of the stated connections established by lead lines 41 and 42. In this regard, there is no DC connection from edge 40 to any other part of the turn illustrated in FIG. 5C. It is necessary for the active outer turn segment 43 to be as close as possible to the two interior portions 36*a* and 36*b* of interior turn segment 36. It is also important for lead lines 41 and 42 to be as narrow as possible, to enable the exterior and interior edges of winding segments 36 and 43 to be as close as possible to each other Because of the constant DC potential of turn portions 36*a* and 36*b* and the close proximity thereof to the magnetic core and the position thereof between turn portion 43 and the remainder of the primary winding and the secondary winding, turn portions 36*a* and 36*b* function effectively as an electrostatic shield between the primary and secondary windings.

The transformer in accordance with the preferred embodiment of the invention includes two stratified or stacked printed circuits, each including fourteen metal layers or rails forming turns on dielectric printed circuit boards. Each metal layer includes a pair of terminals and a central window for receiving a magnetic core that extends through all of the printed circuit boards.

Figure 6:
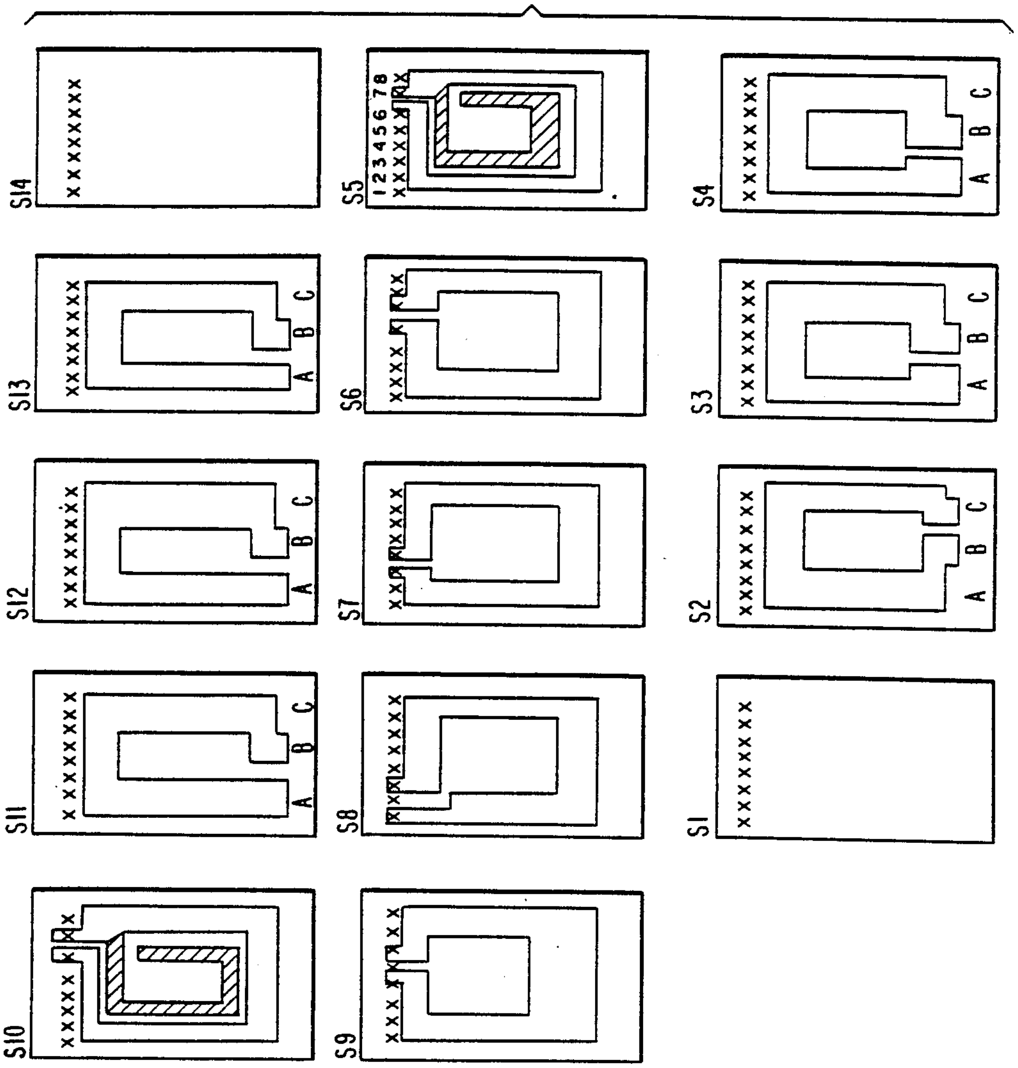
FIG. 6 is a series of top views of fourteen different layers, representing different turns and other structures, of a printed circuit transformer in accordance with the present invention.

Each of the fourteen metallized printed circuit layers illustrated in FIG. 6, is formed on a dielectric printed circuit board, having an exterior rectangular shape with identical dimensions. Metal printed circuit layers S1–S14, forming turns of the half transformer as illustrated generally in FIG. 6, are stacked on each other to form half of the transformer. Half of the transformer primary winding is formed by metal printed circuit layers S5–S10, while half of the secondary winding is formed by metal printed circuit layers S2–S4 and S11–S13. Metal printed circuit layers S1 and S16 at the top and bottom of the stack extend over the complete faces of the dielectric boards on which they are formed, except in the central part thereof; where a window (not shown) is provided for the magnetic core. Layers S1 and S16 provide mechanical and electrical protection for the windings formed by printed circuit layers S2–S13.

Each of printed circuit boards carrying layers S1–S16 includes eight metallized through holes, positioned generally in a line extending parallel to and proximate an edge of each of the printed circuit boards. The through holes are represented in FIG. 6 by a series of eight X's extending parallel to and in proximity to the top edges of the printed circuit boards for layers S1–S16. The metallized turns on printed circuit boards S5–S10 are connected to different combinations of through holes on these printed circuit boards to establish the connections between the primary winding turns on printed circuit layers S5–S10, as illustrated in FIG. 4 and discussed supra. At the bottom of the printed circuit boards carrying layers S2–S4 and S11–S13 are edges of the metallized layers defining terminals A, B and C of the secondary winding, as illustrated in FIG. 2. Each of printed circuit layers S2–S4 and S11–S13 includes two adjacent, spaced edges defining the terminals for the turn associated with that layer. Thus, for example, the center and left edges of printed circuit layers S3, S4 and S11–S13 are provided, to the exclusion of the right terminal portion; in contrast, printed circuit layer S2 includes a central edge terminal portion spaced from a right edge terminal portion. The edges of the turns on layers S2–S4 and S11–S13 are connected to each other to form the half secondary winding illustrated in FIG. 2. The edges of the turns on metal printed circuit layers S2–S4 and S–S13 are adjacent the lower edge of the printed circuit boards, as illustrated in FIG. 6, i.e., these edges, which define the terminals for the turns of the secondary winding, are disposed adjacent an edge of the printed circuit boards which is parallel and opposite to the edges which are adjacent the edges close to the plated through holes to which connections are established for the turns of printed circuit layers S5–S10.

Printed circuit layers S5 and S10, forming the outside turns of the primary winding, include active turn portion 28 and electrostatic shield turn portion 29, per FIG.

5a. As illustrated in FIGS. 5a and 6, shield turn portion 29 is wound in an opposite or inverted direction relative to active turn portion 28.

Six of the eight plated through holes on the printed circuit boards for layers S5–S10 are connected in series with each other to achieve the connections corresponding with the connections to turns 21–16, FIG. 4. The plated through holes are at positions 1–8, with connections being established to positions 1 and 3–7. The turn of printed circuit layer S5 is connected to the plated through holes at positions 6 and 7, FIG. 6; the turn of printed circuit layer S6 is connected to the terminals at positions 5 and 6; the turn of printed circuit layer 7 is connected to positions 3 and 4; the turn of printed circuit layer S8 is connected to positions 1 and 3; the turn of printed circuit layer S9 is connected to positions 4 and 6; and the turn of printed circuit layer S10 is connected to positions 6 and 7.

The plated through holes at positions 7 on printed circuit layers S5 and S10, corresponding to turns 21 and 16 (FIG. 4), are connected to terminal 22 and therefore are at the fixed potential of terminal 225 of DC power supply 201. Position 1 of printed circuit layer S8, formed as a turn corresponding with turn 19, FIG. 4, is connected to external terminal 23, having maximum voltage variations relative to the fixed voltage of terminal 22. The plated through holes at positions 2 and 8 of all of the printed circuit layers are open circuited. Because positions 1 and 3–7 of printed circuit layers S5–S10 are in proximity to one edge of the printed circuit boards carrying the layers, the plated through holes are easily accessible, to enable the connections to be easily changed during production. When the terminals of two printed circuits are connected, coupling between them is simplified and facilitated.

The windows cut on the boards for layers 5 and 14 are generally aligned with corresponding windows cut in the printed circuit boards carrying layers S2–S13.

Figure 7:
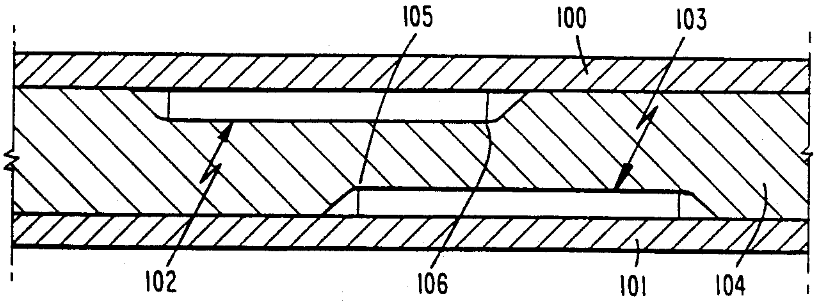
FIG. 7 is a side sectional view of a portion of a printed circuit card or substrate with conductors formed therein to achieve the printed circuit transformer of the present invention.

Reference is now made to FIG. 7 of the drawing, a partial cross-sectional view of the structure including two of the fourteen layers of the printed circuit transformer. The structure illustrated in FIG. 7 includes pre-impregnated dielectric plate or substrate 104 having opposite faces on which are deposited metal, preferably copper, layers 102 and 103. Layers 102 and 103 are preferably engraved into opposite faces of substrate 104 so that the copper layers are electrically insulated from each other by the dielectric of the substrate. Metal layers 102 and 103 on positioned on substrate 104 so that the edges thereof are not aligned; for example, edges 105 and 106 are displaced from each other. Metal layers 102 and 103 and the opposite faces of substrate 104 are covered by dielectric layers 100 and 101, respectively. Dielectric layers 100 and 101 protect metal layers 102 and 103, while enabling numerous substrates to be stacked on each other, as schematically illustrated in FIG. 4. Hence, the metal layers illustrated in FIG. 6 are, in the preferred embodiment, arranged so that they are on opposite faces of the same dielectric substrate.

The overall structure of FIG. 7 enables the thickness of the transformer to be reduced because the metallized turns are deposited on opposite faces of the same dielectric substrate. In addition, the likelihood of metallized layers 102 and 103 being scored is minimized because of the protection afforded for them by dielectric layers 100 and 101. Further, the primary and secondary windings are closely spaced, being separated only by abutting dielectric layers 100 and 101 on adjoining pairs of substrates 104.

Figure 8:
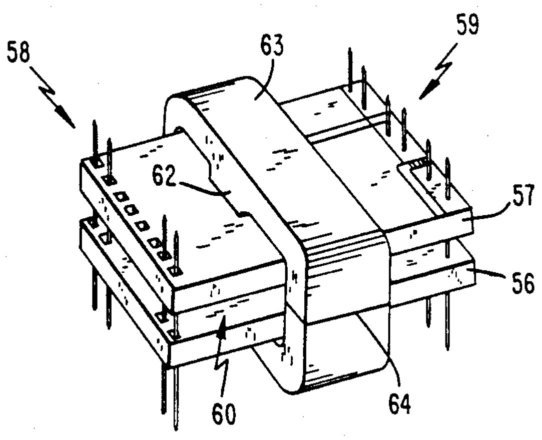
FIG. 8 is a perspective view of a complete transformer incorporating the present invention.
Figure 9:
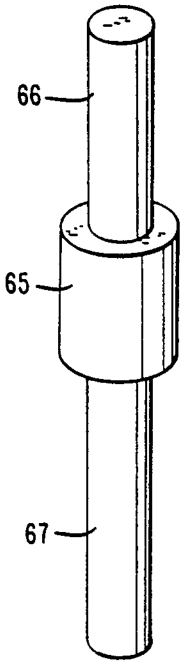
FIG. 9 is a view of a connector and separator employed in the transformer of FIGS. 6 and 8.
Figure 10:
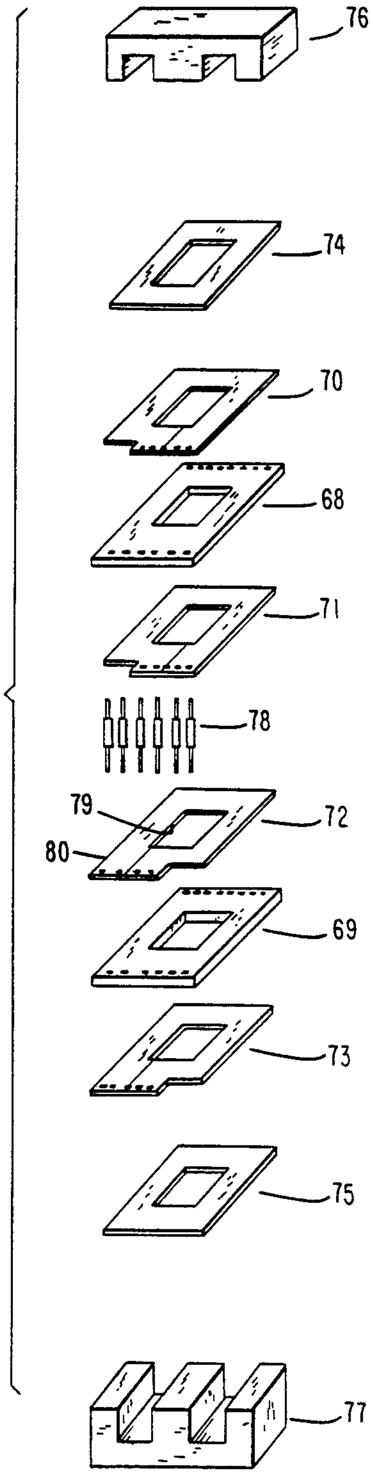
FIG. 10 is an exploded view of the transformer illustrated in FIG. 8.

FIGS. 8 and 10 are respectively perspective and exploded views of a complete transformer incorporating a pair of half-transformers illustrated in FIGS. 1–6. Each half-transformer includes, in the illustrated embodiment, fourteen stacked layers having winding configurations as illustrated in FIG. 6. Two such stacked assemblies are located in mutually parallel planes, with connections being established by the connector illustrated in FIG. 9 to the plated through holes of the primary winding turns on printed circuit layers S5–S10 and to the terminals of the secondary winding turns on printed circuit layers S2–S4 and S11–S13. The two half-transformers are magnetically coupled together by a magnetic core.

In particular, as illustrated in FIG. 8, a complete transformer includes parallel, pancake-like assemblies 56 and 57, each including a half-primary winding and a half-secondary winding. Each of assemblies 56 and 57 is constructed basically as described, infra, in connection with FIGS. 2–7. The turns of the primary winding are connected together by the connector of FIG. 9 being threaded through the plated through holes illustrated on the left side of assemblies 56 and 57. Connections to the turns of the secondary winding of assemblies 56 and 57 are established to plated areas on the right side of FIG. 8. As illustrated in FIG. 10, connections are established between the turns of the primary winding by connectors 58, while connections to the secondary winding are established by connectors 59.

Connectors 58 and 59 are illustrated in detail in FIG. 9 as including a central, rigid dielectric cylinder 65 having parallel opposite faces from which extend mutually insulated, relatively rigid, aligned metal wires 66 and 67. Since opposite planar faces of assemblies 56 and 57 bear against the opposite faces of cylinder 65 which functions as a spacer for maintaining assemblies 56 and 57 in a spaced relationship with each other, cooling fluid flows easily between the assemblies. The height of cylinder 65 and thereby the spacing between the interior faces of assemblies 56 and 57 is determined as a function of the flow rate and nature of coolant flowing in volume 60 between the interior parallel faces of assemblies 56 and 57.

Wires 56 of connectors 58 extend through the aligned plated through holes in assembly 57 to establish connections between the plated through holes; similarly, wires 67 extend through the aligned plated through holes of assembly 56 to establish the desired connections. Wires 66 and 67 have sufficient length to extend completely through the aligned through holes of assemblies 56 and 57; the wires also extend beyond the upper and lower faces of assemblies 56 and 57. Thereby, wires 66 and 67 establish electrical connections to the turns of the primary and secondary windings of assemblies 56 and 57. Because wires 66 and 67 extend beyond the top and bottom exterior faces of assemblies 56 and 57, they provide some heat transfer of relatively cool, exterior fluid to the transformer interior layers.

Assemblies 56 and 57 are arranged so that the central cutout portions or windows of the stacked printed circuit boards are aligned to receive central portion 62 of closed magnetic core 160. Magnetic core 160 is divided into two identical halves, having abutting faces bonded together at median plane 64 which is coincident with the median plane of volume 60 and of the transformer as a whole. Closed core 160 has virtually no air gap, to provide a low reluctance path for coupling magnetic flux between the central exterior legs 63 of the core.

In the exploded view of FIG. 10, the complete transformer is illustrated as including core halves 76 and 77, which form core 160, FIG. 8. The core includes a central leg, as discussed supra, as well as two exterior legs. Between the interior and exterior legs are two windows in which are located dielectric plates 74 and 75. Plates 74 and 75 respectively fit into and abut against core halves 76 and 77.

Stacked on dielectric plates 74 and 75 are metal plates 70 and 73, respectively. Each of plates 74 and 75 has a thickness greater than that of the metallized layers 102 and 103 on the printed circuit boards. Plates 70 and 73 include apertures for receiving wires 66 and 67 and a central window, as well as an elongated slot. The slot extends between the central window and edges that define terminals on the metallized printed circuit layers forming the secondary winding turns. Stacked on plates 70 and 73 are stacked printed circuit assemblies 68 and 69 forming the half-primary and half-secondary windings illustrated in FIGS. 2-7. Assemblies 68 and 69 are identical, being arranged and connected together as illustrated and described in connection with FIGS. 1, 2, 4 and 7.

Stacked on assemblies 68 and 69 are plates 71 and 72, respectively having configurations identical to the configurations of plates 70 and 73. Plates 70 and 71 include a notch on the left-hand side thereof, while plates 72 and 73 include a notch on the right-hand side thereof, as illustrated in FIG. 10. Hence, plates 70–73 are basically transformer turns having oppositely positioned terminals between a slit extending from the edges of the turn to the window in the center of the turn. Plates 70 and 73 increase the available current to the secondary winding.

The chopper power supply of the invention has enhanced chopping effects as a result of the turns of the secondary winding included in printed circuit assemblies 68 and 69. Dielectric plates 74 and 75 enable the turns on plates 70 and 73 to be electrically insulated from magnetic core halves 76 and 77. Isolation between printed circuit assemblies 68 and 69 and plates 70–73 is assured by dielectric layers 100 and 101 that cover substrate 104 and metal printed circuit layers 102 and 103.

The positioning of turns 70–73 is assured by connectors 78, each configured in the same manner as the connector illustrated in FIG. 9. The interior cuts or windows 79 and the exterior surfaces 80 of layers 68–75 are dimensioned to assure separation between these layers and the interior and exterior, horizontally extending walls (as illustrated in FIG. 10) of magnetic core halves 76 and 77. Thereby, all of layers 68–75 are electrically insulated from the magnetic core.

While there have been described and illustrated several specific embodiments of the invention, it will be clear that variations in the details of the embodiments specifically illustrated and described may be made without departing from the true spirit and scope of the invention as defined in the appended claims.

What is claimed is:

1. A chopper power supply comprising first and second opposite polarity DC power supply terminals, a transformer having first and second primary winding segments, first and second switching devices connected to be responsive to a control source so that the first device connects the first primary winding segment to the first and second opposite polarity terminals at a time mutually exclusive from the time the second primary winding segment is connected to the DC terminals via the second device, and vice versa, the transformer including first and second secondary winding segments respectively associated with the first and second primary winding segments, each of the secondary winding segments including first and second portions disposed on opposite sides of the primary winding segment associated with the secondary winding segment, the portions of the first secondary winding segment being connected in series with each other and coupled to the first primary winding segment so that the voltages induced in the portions of the first secondary winding segment add together, and the portions of the second secondary winding segment being connected in series with each other and coupled to the second primary winding segment so that the voltages induced in the portions of the secondary segment add together.

2. The chopper power supply of claim 1 further including a shield turn for each of the primary winding segments, said shield turn for the first primary winding segment being connected to one end of the first primary winding segment and being disposed between said one end of the first primary winding segment and one end of one portion of the first secondary winding segment, and said shield turn for the second primary winding segment being connected to one end of the second primary winding segment and being disposed between said one end of the second primary winding segment and one end of one portion of the second secondary winding segment.

3. The chopper power supply of claim 1 further including a shield turn for each of the primary winding segments, said shield turn for the first primary winding segment have one terminal connected to one end of the first primary winding segment and a second open circuited terminal, said shield turn for the first primary winding segment being disposed between said one end of the first primary winding segment and one end of one portion of the first secondary winding segment, and said shield turn for the second primary winding segment being connected to one end of the second primary winding segment and being disposed between said one end of the second primary winding segment and one end of one portion of the second secondary winding segment.

4. The chopper power supply of claim 1 further including first and second shield turns for each of the primary winding segments, the first and second shield turns for the first primary winding segment being respectively connected to opposite first and second ends of the first primary winding segment and being respectively disposed between said first and second ends of the first primary winding segment and adjacent ends of the first and second portions of the first secondary winding segment, and the first and second shield turns for the secondary primary winding segment being respectively connected to opposite first and second ends of the second primary winding segment and being respectively disposed between said first and second ends of the second primary winding segment and adjacent ends of the first and second portions of the second secondary winding segment.

5. The chopper power supply of claim 4 wherein each of the shield turns includes an open circuited terminal.

6. The chopper power supply of claim 5 further including first and second coupling capacitors, the first coupling capacitor being connected between said first end of the first primary winding segment and the adjacent end of the first portion of the first secondary winding segment, and the second coupling capacitor being connected between said first end of the second primary winding segment and the adjacent end of the first portion of the second secondary winding segment.

7. The chopper power supply of claim 1 further including first and second coupling capacitors, the first coupling capacitor being connected between a first end of the first primary winding segment and an adjacent end of the first portion of the first secondary winding segment, and the second coupling capacitor being connected between a first end of the second primary winding segment and an adjacent end of the first portion of the second secondary winding segment.

8. The converter of claim 1 wherein each of the windings includes plural turns, each of the turns being formed as a metal layer on a dielectric printed circuit board.

9. The converter of claim 8 wherein the boards of the first primary winding segment and first secondary winding segment are positioned in a first stack and the boards of the second primary winding segment and second secondary winding segment are positioned in a second stack that is magnetically coupled to the first stack.

10. The converter of claim 9 wherein each of the stacks includes a longitudinally extending window, a magnetic core having first and secondary legs respectively extending through the windows of the first and second stacks.

11. A chopper power supply comprising first and second opposite polarity DC power supply terminals, a transformer having first and second half-primary windings, first and second switching devices connected to be responsive to a control source so that the first device connects the first half-primary winding to the first and second opposite polarity terminals at a time mutually exclusive from the time the second half-primary winding is connected to the DC terminals via the second device, and vice versa, the transformer including first and second half-secondary windings respectively associated with the first and second half-primary windings, each of the half-secondary windings including first and second segments disposed on opposite sides of the half-primary winding associated therewith, the segments of the first secondary half-winding being connected in series with each other and coupled to the first half-primary winding so that the voltages induced in the segments add together, and the segments of the second secondary half-winding being connected in series with each other and coupled to the second half-primary winding so that the voltages induced in the segments add together.

12. A chopper power supply comprising first and second opposite polarity DC power supply terminals, first and second switching devices activated into a conducting state at different times, a transformer having a primary winding with first and second segments and a secondary winding including first, second and third segments, the third segment having a tap connected to a reference potential, each of the primary winding segments having a first terminal connected to the first power supply terminal, each of the first and second primary winding segments including a second terminal selectively connected to the second power supply terminal via the first and second switching devices, respectively, the first segment of the primary winding being disposed between a first end of the third segment of the secondary winding and a first end of the first segment of the secondary winding, the second segment of the primary winding being disposed between a second end of the third segment of the secondary winding and a first end of the second segment of the secondary winding.

13. The chopper power supply of claim 12 wherein the first ends of the first and third segments of the secondary winding are connected in series with each other and a first load terminal at a potential different from the reference potential.

14. The chopper power supply of claim 12 wherein the first, second and third segments of the secondary winding are connected in series with each other and opposite terminals of a load at a potential different from the reference potential.

15. The chopper power supply of claim 12 further including first and second shield turns respectively connected to the first terminal of each of the first and second segments of the primary winding, the first shield turn being disposed between the first end of the third segment and a first end of the first primary winding segment, the second shield turn being disposed between the second end of the third segment and the first end of the second primary winding segment, the first terminal of each of the first and second segments of the primary winding being at the first ends of the first and second segment of the primary winding, respectively.

16. The chopper power supply of claim 15 wherein each of the shield turns has an open circuited terminal.

17. The chopper power supply of claim 15 further including first and second coupling capacitors, the first capacitor being connected between one end of the third segment and an adjacent end of the first primary winding segment, the second capacitor being connected between a second end of the third segment and an adjacent end of the second primary winding segment.

18. The chopper power supply of claim 15 further including third and fourth shield turns respectively connected to the second terminal of each of the first and second segments of the primary winding, the third shield turn being disposed between the first end of the first segment of the secondary winding and a second end of the first primary winding segment, the fourth shield turn being disposed between the first end of the second segment of the secondary winding and a second end of the second primary winding segment, the second terminal of each of the first and second segments of the primary winding being at the second ends of the first and second segment of the primary winding, respectively.

19. The chopper power supply of claim 18 wherein each of the shield turns has an open circuited terminal.

* * * * *